(12) United States Patent
Sasaki (10) Patent No.: US 7,030,741 B2
(45) Date of Patent: Apr. 18, 2006

(54) VEHICLE-MOUNTED INTRUSION DETECTION APPARATUS

(75) Inventor: Yoshihiro Sasaki, Kobe (JP)

(73) Assignee: Fujitsu Ten Limited, Kobe (JP)

( * ) Notice: Subject to any disclaimer, the term of this patent is extended or adjusted under 35 U.S.C. 154(b) by 16 days.

(21) Appl. No.: 10/626,240

(22) Filed: Jul. 23, 2003

(65) Prior Publication Data

US 2005/0099271 A1    May 12, 2005

Related U.S. Application Data

(63) Continuation of application No. PCT/JP02/12330, filed on Nov. 26, 2002.

(30) Foreign Application Priority Data

Nov. 29, 2001   (JP)   ............................. 2001-364969

(51) Int. Cl.
    *B60R 25/10*   (2006.01)
(52) U.S. Cl. ........................... 340/426.24; 340/426.26; 340/529; 340/552; 367/93
(58) Field of Classification Search ............ 340/426.1, 340/426.24–426.28, 552–554, 529; 307/10.2; 367/93–94; 342/27–28
    See application file for complete search history.

(56) References Cited

U.S. PATENT DOCUMENTS

| | | | | |
|---|---|---|---|---|
| 4,665,379 A | * | 5/1987 | Howell et al. | ......... 340/426.27 |
| 5,396,217 A | | 3/1995 | Proefke et al. | |
| 5,856,778 A | * | 1/1999 | Kani et al. | ............. 340/426.26 |
| 6,057,760 A | * | 5/2000 | Dauphin | ..................... 340/552 |
| 6,157,293 A | * | 12/2000 | Bonhoure | .............. 340/426.26 |
| 6,198,385 B1 | * | 3/2001 | Kani et al. | ............. 340/426.26 |
| 6,462,657 B1 | * | 10/2002 | Perski | ........................ 340/552 |
| 6,631,096 B1 | * | 10/2003 | Gillis et al. | ................. 340/552 |

FOREIGN PATENT DOCUMENTS

| | | |
|---|---|---|
| EP | 0 609 932 | 8/1994 |
| GB | 2 319 842 | 6/1998 |
| JP | 61-171641 | 8/1986 |
| JP | 6-168382 | 6/1994 |
| JP | 8-77466 | 3/1996 |
| JP | 9-274080 | 10/1997 |
| JP | 2000-348263 | 12/2000 |
| JP | 2001-134850 | 5/2001 |

OTHER PUBLICATIONS

International Search Report of PCT/JP02/12330, dated Mar. 4, 2003.
Patent Abstract of Japan, Publication No. 61171641 A, Published on Aug. 2, 1986, in the name of Agari Yoshihide.

(Continued)

*Primary Examiner*—Thomas Mullen
(74) *Attorney, Agent, or Firm*—Christie, Parker and Hale, LLP (57) ABSTRACT

A vehicle-mounted intrusion detection apparatus for detecting an intrusion into a vehicle based on a wave transmitted inside the vehicle and reflected from an object located inside the vehicle, wherein the vehicle-mounted intrusion detection apparatus is configured so as not to recognize the reflected wave as indicating an intrusion if an output level of the reflected wave, after reaching or exceeding a first output level, has reached or exceeded a second output level higher than the first output level within a predetermined time.

11 Claims, 8 Drawing Sheets

OTHER PUBLICATIONS

Patent Abstract of Japan, Publication No. 09274080 A, Published on Oct. 21, 1997, in the name of Goto Masahiro et al.

Patent Abstract of Japan, Publication No. 2001134850 A, Published on May 18, 2001, in the name of Sasaki Yoshihiro.

Patent Abstract of Japan, Publication No. 06168382 A, Published Jun. 14, 1994 in the name of Didier Pedemas.

Patent Abstract of Japan, Publication No. 08077466 A, Published Mar. 22, 1996 in the name of Hayashi Toshio.

Patent Abstracts of Japan, Publication No. 2000348263, Published Dec. 15, 2000 in the name of Kato Manabu.

European Search Report, dated Dec. 27, 2004, for Application No. 02783625.3, for Fujitsu Ten Limited.

* cited by examiner

VEHICLE-MOUNTED INTRUSION DETECTION APPARATUS

CROSS-REFERENCE TO RELATED APPLICATION

This application is a continuation application based on PCT/JP02/12330, filed Nov. 26, 2002, which claims priority of Japanese patent application number 2001-364969, filed Nov. 29, 2001.

TECHNICAL FIELD OF THE INVENTION

The present invention relates to a vehicle-mounted intrusion detection apparatus, for preventing illegal intrusion into a vehicle, using radio waves or ultrasonic waves and, more particularly, to a vehicle-mounted intrusion detection apparatus that is configured to be able to effectively prevent erroneous detections.

DESCRIPTION OF THE RELATED ART

Figure 1:
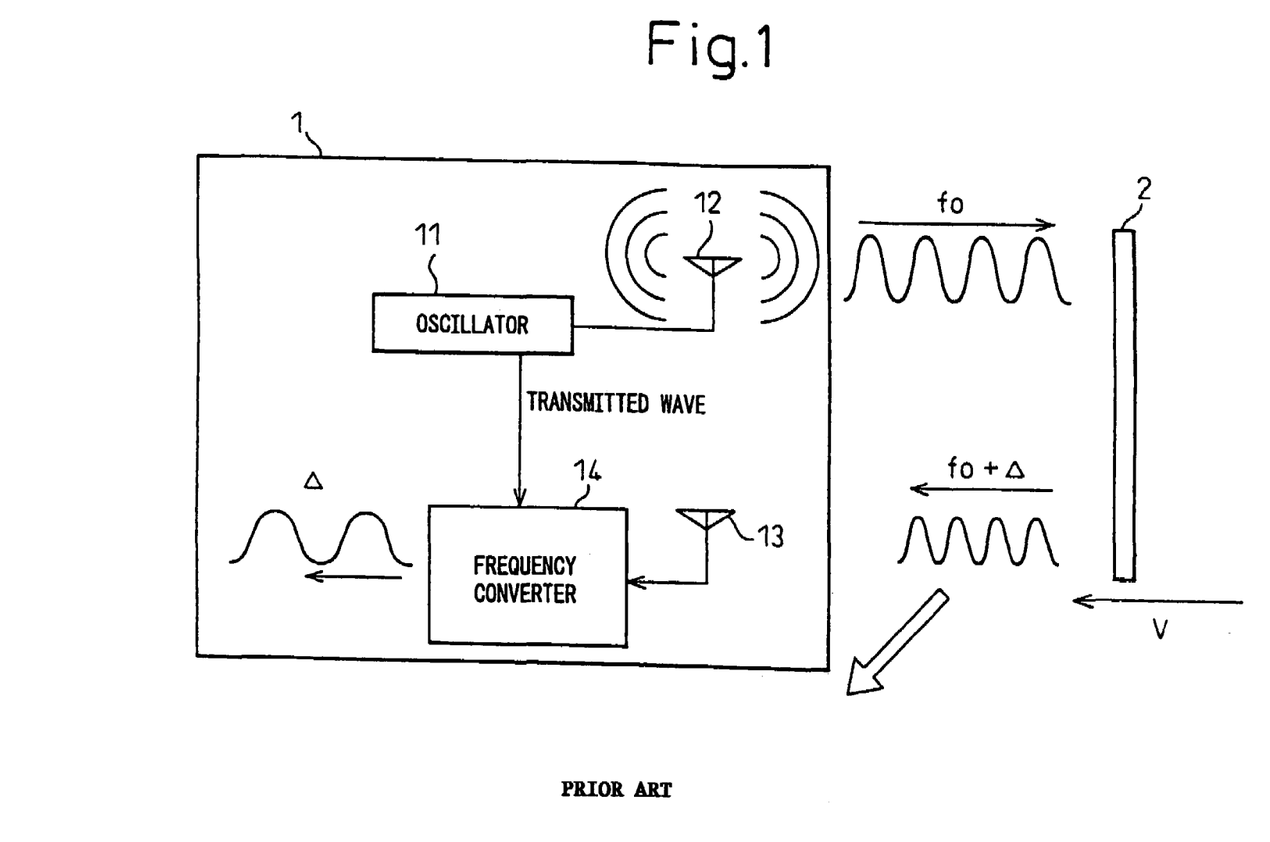
FIG. 1 is a simplified block diagram showing the configuration of a vehicle-mounted intrusion detection apparatus according to the prior art.

FIG. 1 is a simplified block diagram showing the configuration of a vehicle-mounted intrusion detection apparatus for detecting an intruder in a vehicle. In the figure, reference numeral 1 is the vehicle-mounted intrusion detection apparatus, and 2 is an object such as an intruder. The vehicle-mounted intrusion detection apparatus 1 comprises an oscillator 11 which produces a radio wave output, for example, of 2.45 GHz, a transmitting antenna 12, a receiving antenna 13, and a frequency converter 14, and is mounted in a suitable position such as, for example, on the ceiling inside the vehicle.

In the apparatus of FIG. 1, the output, for example, of 2.45 GHz produced by the oscillator 11 is radiated from the antenna 12 toward the object 2. The reflected wave from the object 2 is received by the receiving antenna 13 and mixed, in the frequency converter 14, with a portion of the transmitted wave to produce a beat signal.

In operation, if a moving object is detected inside the vehicle, the vehicle-mounted intrusion detection apparatus detects the object as an intruder. The Doppler effect is utilized in the detection of a moving object. Suppose here that the object 2 is moving; in this case, the reflected wave is slightly shifted in frequency due to the Doppler effect. When the transmitted frequency is $f_o$, for example, the reflected frequency is given as $f_o+\Delta$. Here, the amount of shift, $\Delta$, is derived from the following equation.

$$\Delta = \text{Reflected frequency} - \text{Transmitted frequency} = (2v/c) f_o \quad (1)$$

v: Relative velocity of object 2 with respect to sensor
c: Velocity of light

As can be seen from equation (1), the value of $\Delta$ is extremely small compared with the frequency of the transmitted wave $f_o$. For example, when the transmitted frequency is 2.45 GHz, $\Delta$ is on the order of several tens of Hz. Since it is difficult to measure the amount of shift $\Delta$ directly, beats occurring between the transmitted wave and the received wave are measured, and a signal of a frequency equal to the amount of shift $\Delta$ is output.

However, in the case of the vehicle-mounted intrusion detection apparatus shown in FIG. 1, if the apparatus itself is shaken by an impact applied to the vehicle body, such as when a soccer ball hits the vehicle body or when the vehicle body is shaken by a sudden gust of wind, the resulting relative movement may be erroneously recognized as being the occurrence of an alarm condition, resulting in the production of an alarm output even when the reflecting object is not moving. Furthermore, in such cases where a soccer ball hits the vehicle body and the vehicle body is temporarily deformed and then restored to its original shape, or where the hood of the vehicle is temporarily deformed by the user during car washing, for example, the vehicle-mounted intrusion detection apparatus may be shaken due to such a deformation of the vehicle body, causing a relative movement between the vehicle-mounted intrusion detection apparatus and the reflecting object; this can also result in the production of a false alarm.

SUMMARY OF THE INVENTION

Accordingly, an object of the present invention is to provide a vehicle-mounted intrusion detection apparatus that does not erroneously recognize the shaking of a vehicle body unrelated to a theft, such as described in the above examples, as being the occurrence of an intrusion.

To solve the above problem, the invention provides, as a first apparatus, a vehicle-mounted intrusion detection apparatus for detecting an intrusion into a vehicle based on a wave transmitted inside the vehicle and reflected from an object located inside the vehicle, wherein the vehicle-mounted intrusion detection apparatus is set so as not to recognize the reflected wave as indicating an intrusion if an output level of the reflected wave, after reaching or exceeding a first output level, has reached or exceeded a second output level higher than the first output level within a predetermined time.

Generally, an impact caused by a soccer ball or like object hitting a vehicle body suddenly shakes the vehicle body. Accordingly, the rise time of the received signal output produced in such case is much shorter than in the case of a human intrusion. In view of this, the first level and the second level higher than the first level is set for the signal output level and, when the time taken for the output to rise from the first level to the second level is shorter than the predetermined time, it is determined that the event is not one caused by a human intrusion or other illegal conduct. An erroneous detection can thus be avoided.

The invention provides, as a second apparatus, a vehicle-mounted intrusion detection apparatus for detecting an intrusion into a vehicle based on a wave transmitted inside the vehicle and reflected from an object located inside the vehicle, wherein the vehicle-mounted intrusion detection apparatus is set so as not to recognize the reflected wave as indicating an intrusion if an output level of the reflected wave that is higher than a predetermined level has not lasted continuously for a predetermined length of time.

In such cases where the vehicle body is shaken by a sudden gust of wind, or where some kind of shock is applied from the outside, the impact applied to the vehicle body settles down in a short time. In view of this, an erroneous detection can be avoided by determining that the event is not one caused by a human intrusion, or other illegal conduct, if the output of the receiving means, which has exceeded the predetermined level that enables the detection of an intrusion, has not lasted continuously for the predetermined length of time.

The invention provides, as a third apparatus, a vehicle-mounted intrusion detection apparatus for detecting an intrusion into a vehicle based on a wave transmitted inside the vehicle and reflected from an object located inside the vehicle, wherein the vehicle-mounted intrusion detection apparatus is set so as not to recognize the reflected wave as indicating an intrusion if the frequency of the reflected wave is outside a predetermined frequency range.

The output frequency of the receiving means generated by detecting a human intrusion does not cover a wide frequency range, but falls within a relatively limited frequency range. In view of this, when the output frequency of the receiving means is outside the predetermined frequency range that indicates the detection of a human intrusion, the output is not determined as being one indicating an intrusion. Erroneous detection can thus be avoided.

A fourth apparatus of the invention is characterized in that the detection is determined as being an erroneous detection if any one of the erroneous detection avoiding conditions prescribed in the first, second, and third apparatuses is satisfied.

A fifth apparatus of the invention is characterized in that the detection is determined as being an erroneous detection if both of the erroneous detection avoiding conditions prescribed in the first and second apparatuses are satisfied.

A sixth apparatus of the invention is characterized in that the detection is determined as being an erroneous detection if both of the erroneous detection avoiding conditions prescribed in the second and third apparatuses are satisfied.

By combining the detection avoiding conditions in various ways, as in the fourth, fifth, and sixth apparatuses, a vehicle-mounted intrusion detection apparatus can be achieved that can effectively prevent erroneous detections arising from various kinds of external impacts.

The present invention further provides a vehicle equipped with any one of the first, second, or third apparatus. According to such vehicles, an attempted car-theft can be effectively detected while avoiding erroneous detection.

DESCRIPTION OF THE PREFERRED EMBODIMENTS

Figure 2:
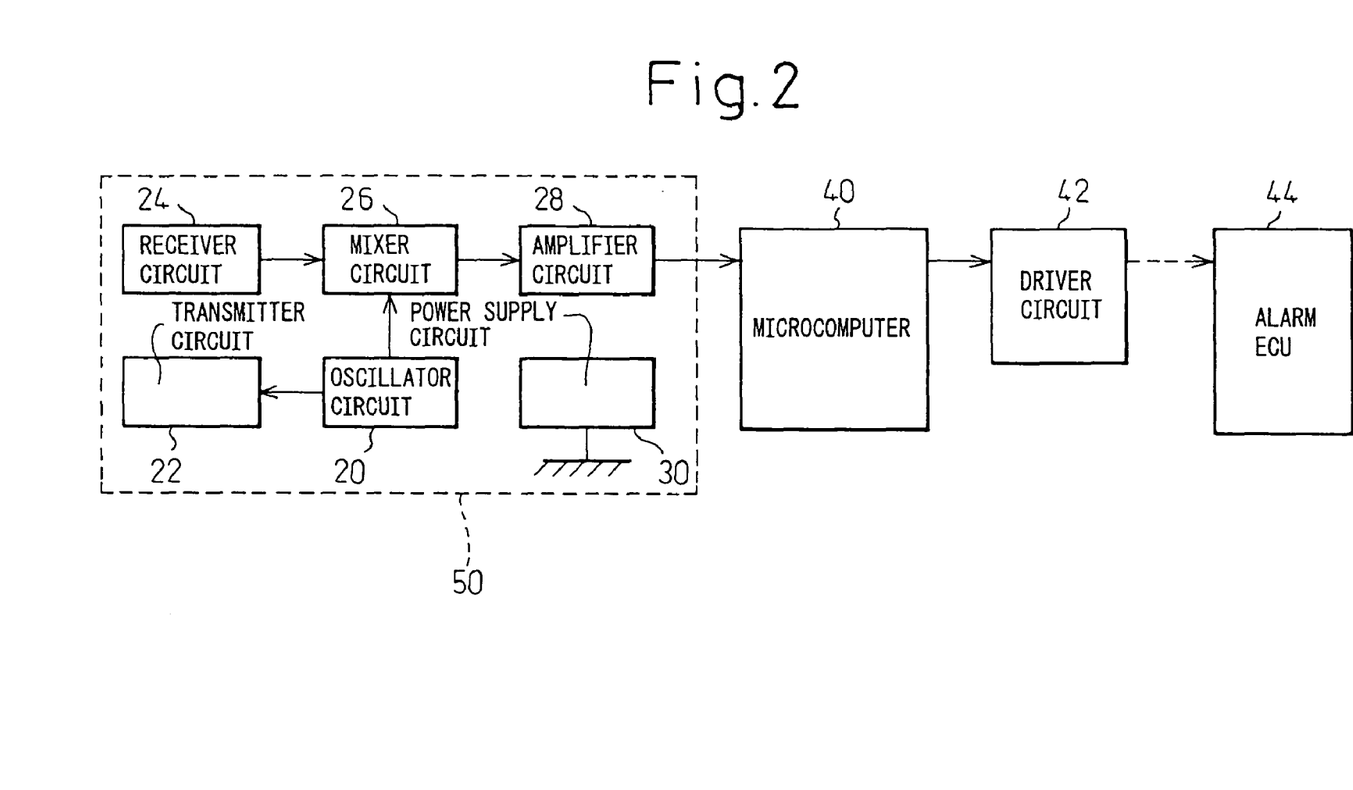
FIG. 2 is a block diagram showing the configuration of a vehicle-mounted intrusion detection apparatus according to one embodiment of the present invention.

FIG. 2 is a block diagram showing the circuit configuration of a vehicle-mounted intrusion detection apparatus according to one embodiment of the present invention. In the figure, reference numeral 20 is an oscillator circuit, 22 is a transmitter circuit, 24 is a receiver circuit for receiving a reflected wave, 26 is a mixer circuit for producing a beat signal by mixing the transmitted wave with the received wave, 28 is an amplifier circuit for amplifying the output of the mixer circuit, and 30 is a power supply circuit.

Further, in FIG. 2, reference numeral 40 is a microcomputer which receives the output of the amplifier circuit 28, analyzes the signal, and detects an intrusion into the vehicle. The output of the microcomputer 40 is sent via a driver circuit 42 to an alarm ECU (electronic control unit) 44 which produces an alarm output indicating the occurrence of an alarm condition. The alarm ECU 44 may be configured to operate exclusively for the vehicle-mounted intrusion detection apparatus, but usually, this ECU also incorporates functions to indicate alarm conditions based on signals received from sensors in general, including door sensors.

In FIG. 2, the block enclosed by dashed lines is generally construction as a sensor 50, which is mounted in a suitable position inside the vehicle such as, for example, on the ceiling. Alternatively, the sensor may be mounted near the map lamp inside the vehicle. Further, both the microcomputer 40 and the driver circuit 42 may also be incorporated into the sensor.

Figure 3:
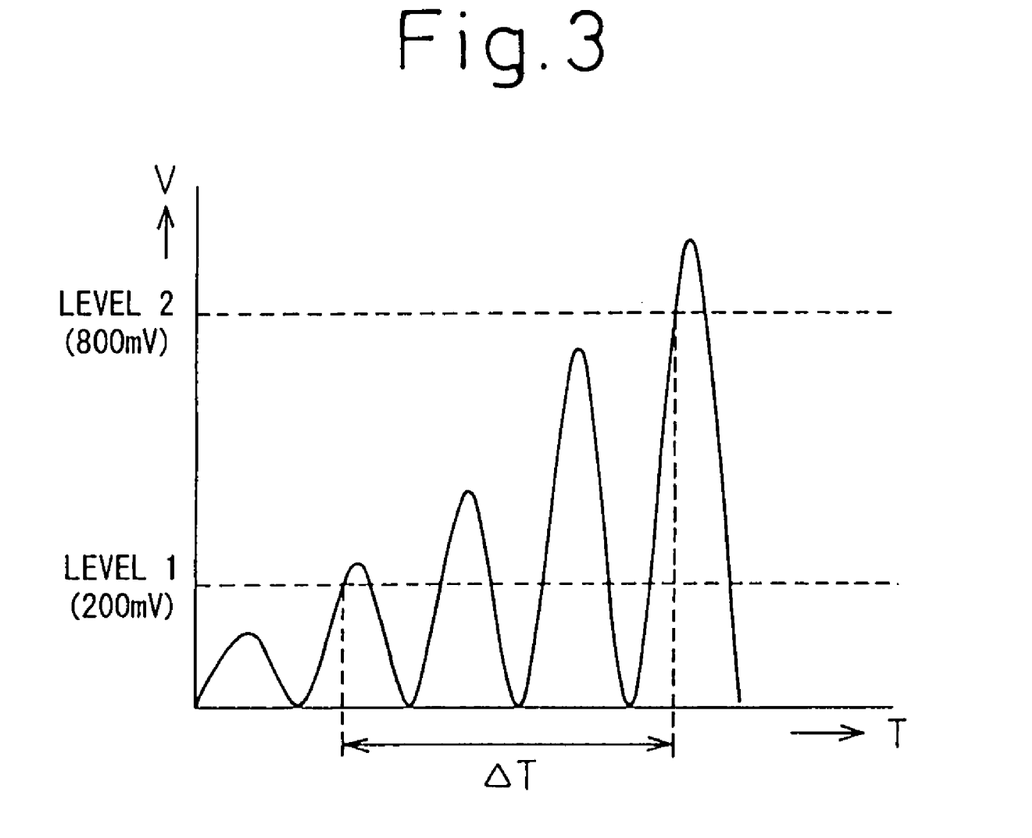
FIG. 3 is a waveform diagram illustrating the operating principle of a vehicle-mounted intrusion detection apparatus according to a first embodiment of the present invention.

FIG. 3 is a signal waveform diagram for explaining the operating principle of a vehicle-mounted intrusion detection apparatus according to a first embodiment of the present invention; the diagram shows the signal waveform of the beat signal that is output from the amplifier circuit 28 and full-wave rectified in the microcomputer 40.

When the vehicle is hit by a soccer ball or like object, the deformation of the vehicle due to the impact occurs in a short time, and ends in a short time. Accordingly, the intensity of the beat wave produced by the mixer circuit 26 in this case has a tendency to rapidly rise toward a maximum value the instant the presence of the beat wave is recognized and to rapidly drop after reaching the maximum value. On the other hand, when a person intruding into the vehicle is detected, the intensity of the resulting beat wave increases relatively slowly with the movement of the intruder. In view of this, when a rapid rise is detected in the beat wave signal, it can be determined that the beat signal is not the result of an intrusion for an attempted theft or the like, but only the result of an impact applied to the vehicle body from the outside.

Therefore, in the beat wave signal waveform (sensor signal) shown in FIG. 3, a threshold value based on which the presence of an intrusion can be recognized is set as level 1 (in the illustrated example, 200 mV), and a level greater than the level 1 but smaller than the maximum value is set as level 2 (in the illustrated example, 800 mV); then, the time $\Delta T$ from the moment the output exceeds the level 1 to the moment it reaches the level 2 is measured. If $\Delta T$ is less than a predetermined time t, the beat signal is determined as being the result of an impact, and is not regarded as one arising from an illegal intrusion. A value that can sufficiently discriminate an output fluctuation due to an impact from an output fluctuation due to an intrusion is chosen for the predetermined time t through various experiments. When $\Delta T$ is equal to or longer than the thus chosen predetermined time, it can be determined that a person attempting an illegal intrusion has been detected. This serves to prevent an alarm from being erroneously triggered by a shaking of the vehicle body unrelated to a theft. The level 1 may be set higher than the above threshold value, but should be chosen to be sufficiently smaller than the level 2. A relatively high value that occurs when an intrusion is detected is chosen for the level 2.

Figure 4:
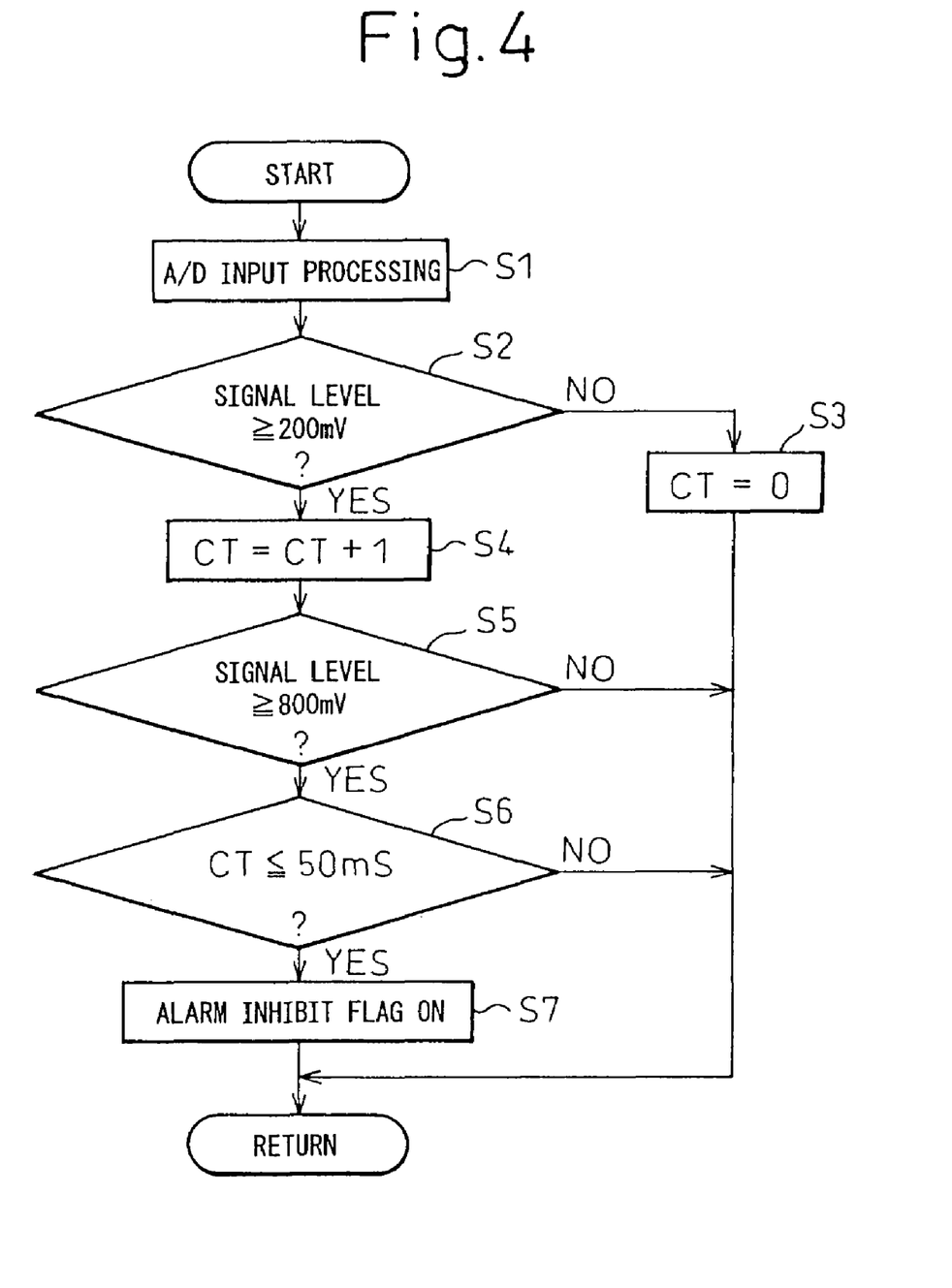
FIG. 4 is a flowchart for explaining the operation of the vehicle-mounted intrusion detection apparatus according to the first embodiment of the present invention.

FIG. 4 is a flowchart illustrating a processing procedure when the microcomputer 40 implements the erroneous recognition prevention principle described above. The processing routine shown in FIG. 4 is executed repeatedly at predetermined intervals of time. First, in step S1, A/D input processing is performed to convert the analog signal, input from the amplifier circuit 28, into a digital signal, and after that, full-wave rectification is performed. Next, in step S2, it is determined whether the value of the input signal is either equal to or greater than the first level. In the present embodiment, the first level is chosen to be 200 mV.

If the answer in step S2 is NO, that is, if the value is smaller than the intensity based on which the occurrence of a beat signal can be recognized, then, in step S3, the counter value is initialized (to 0), and the process is terminated, thus preparing for the next cycle of processing. On the other hand, if the answer in step S2 is YES, that is, if the value has reached the intensity based on which the occurrence of a beat signal can be recognized, the counter value is incremented by 1 in step S4.

Next, in step S5, it is determined whether the level of the beat signal is either equal to or greater than the second level. In the present embodiment, the second level is chosen to be 800 mV. If the answer in step S5 is NO, the process is terminated, to prepare for the next cycle of processing. In this way, if the signal is greater than the level 1 but smaller than the level 2, the counter is incremented in step S4 in synchronism with the signal sampling cycle, and the time ΔT is measured.

When the signal output exceeds the level 2, and as the answer in step S5 is YES, the process proceeds to the next step S6 where it is determined whether the counter value, i.e., ΔT, has yet to reach the predetermined value t, for example, 50 ms.

If the answer in step S6 is YES, that is, if the time taken for the beat signal intensity to rise from the level 1 to the level 2 is less than t (50 ms), then it can be determined that the occurrence of the event here is merely due to an external impact, and therefore, in step S7, an alarm inhibit flag is set ON. When the alarm inhibit flag is ON, the microcomputer 40 does not recognize the event as being the occurrence of an intrusion, and therefore, does not output an alarm signal, even if the output signal has exceeded the threshold.

If the answer in step S6 is NO, the time ΔT taken for the intensity to rise from the level 1 to the level 2 is sufficiently long, and it can be determined that the occurrence of the event is due to an illegal intrusion; therefore, the microcomputer 40 recognizes this as an alarm condition and outputs an alarm signal in accordance with a processing flow different from the processing flow of FIG. 4.

In FIG. 2, the block enclosed by dashed lines is generally constructed as a sensor 50, which is mounted in a suitable position inside the vehicle such as, for example, on the ceiling. Alternatively, the sensor may be mounted near the map lamp inside the vehicle. Further, both the microcomputer 40 and the driver circuit 42 may also be incorporated into the sensor.

Figure 5:
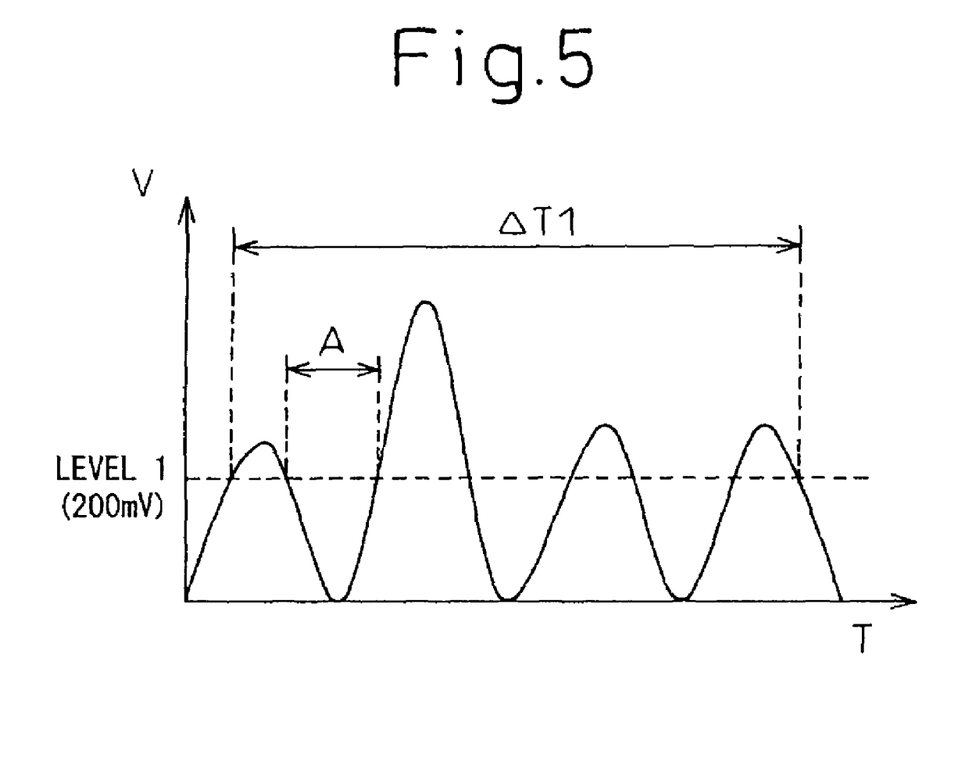
FIG. 5 is a waveform diagram illustrating the operating principle of a vehicle-mounted intrusion detection apparatus according to a second embodiment of the present invention.
Figure 6:
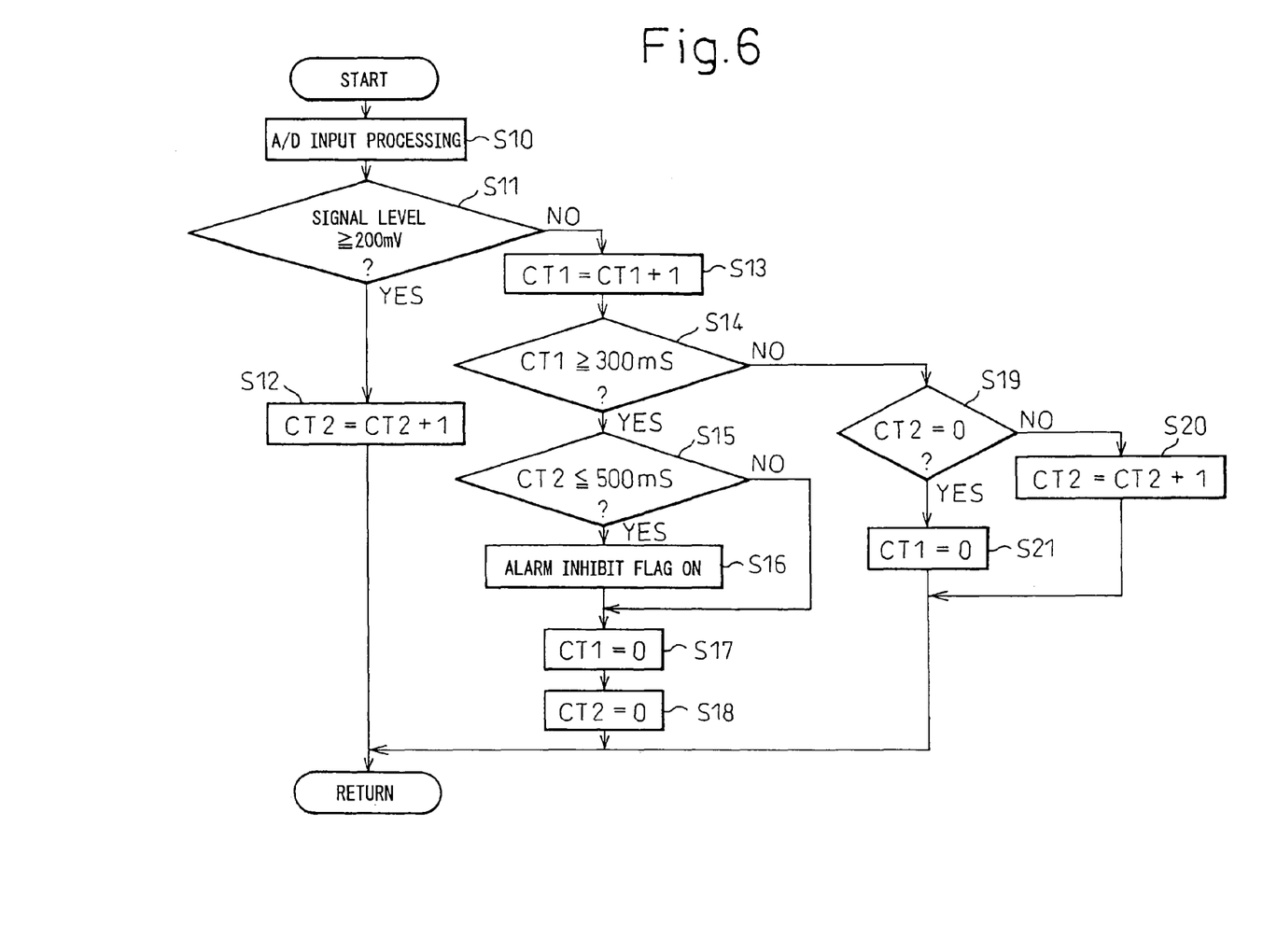
FIG. 6 is a flowchart for explaining the operation of the vehicle-mounted intrusion detection apparatus according to the second embodiment of the present invention.

FIG. 5 is a waveform diagram of a beat signal illustrating the operating principle according to a second embodiment of the present invention, and FIG. 6 is a diagram illustrating a flow of operation when the microcomputer 40 carries out the embodiment. As shown in FIG. 5, in this embodiment, duration time ΔT1 is measured when the output signal has exceeded a threshold value (for example, the first level of 200 mV) based on which an alarm condition can be recognized; when the value of ΔT1 is not larger than a predetermined value t1, the event is not regarded as the occurrence of an illegal intrusion, and an alarm output is not produced. On the other hand, if the signal exceeding the predetermined level has continued for more than the predetermined time t1, the event is regarded as the occurrence of an illegal intrusion, and an alarm output is produced.

This is to prevent erroneous detection by utilizing the fact that, in the case of the shaking of a vehicle body caused by a sudden gust of wind or the vehicle hood being deformed by the user during car washing, the alarm condition detecting signal ends in a relatively short time, while in the case of human intrusion, the output signal indicating an alarm condition is relatively slow and continues for a relatively long time.

Next, the processing procedure of the present embodiment will be described with reference to the flowchart of FIG. 6. First, in step S10, A/D input conversion processing is performed. Next, in step S11, it is determined whether the signal intensity is either equal to or greater than the threshold value (level 1), for example, 200 mV. If the answer in step S11 is YES, that is, if the signal output exceeds the threshold value based on which the occurrence of an alarm condition is detected, a counter CT2 is incremented in step S12, thus preparing the process for the next cycle of signal sampling. In the next cycle of signal sampling, if the signal output is again above 200 mV, the counter is further incremented. In this way, the duration of time that the signal is equal to or greater than 200 mV is indicated by the contents of the counter CT2.

If the answer in step S11 is NO, that is, if the signal is less than 200 mv, this means either that there was no alarm condition in the first place and the signal output is therefore below the threshold, or that the signal output is at an intermediate point between one signal and the next signal, as shown by the period A in FIG. 5. Accordingly, in the present embodiment, a counter CT1 is provided that counts the time that the signal output is below the threshold value and, when the counter reading indicates a time not longer than a predetermined time, for example, 300 ms or less, it is determined that the signals before and after it are a continuous series of signals being generated due to the occurrence of an alarm condition. If the counter reading exceeds 300 ms, that is, if the period A is longer than 300 ms, then the signals before and after it are recognized as being signals each generated due to the occurrence of a different alarm condition, and the counter CT2 is thereupon cleared.

More specifically, the counter CT1 is incremented in step S13, and it is determined in step S14 whether the value of the counter CT1 exceeds 300 ms. If, in step S14, the reading of the counter CT1 exceeds 300 ms (YES in step S14), the signals before and after the period are not regarded as a continuous series of signals, as described above. Accordingly, if the value of the counter CT2 in the next step S15 is either equal to or less than 500 ms (YES in step S15), the alarm inhibit flag is set ON in step S16 to inhibit the alarm output. Further, the respective counters are cleared in steps S17 and S18.

On the other hand, if the counter CT2 in step S15 has already counted more than 500 ms, this means that the alarm condition indicating signal has been output for a period exceeding 500 ms but the signal is interrupted at present; therefore, the process skips the alarm inhibit flag ON step S16, and proceeds to steps S17 and S18 where the respective counters CT1 and CT2 are initialized to 0, thus preparing the process for the next cycle of sampling.

If, in step S14, the value of the counter CT1 is less than 300 ms, it can be determined that the signals before and after the period in the waveform diagram of FIG. 5 are a continuous series of signals being generated due to some kind of alarm condition; accordingly, it is verified in step S19 that the value of the counter CT2 is not 0 (NO in step S19), and the value of the counter CT2 is incremented in step S20 to count the duration time of the signal. On the other hand, if the value of the counter CT2 is 0 in step S19 (YES in step S19), the counter CT1 is initialized in step S21, thus preparing the process for the next sampling cycle.

In the above process, it can be said that the control is performed by checking whether the period during which the output exceeds the threshold has lasted continuously for the predetermined period (500 ms).

In the present embodiment, if the continuous series of signals that can be regarded as being generated due to the same alarm condition has continued, for example, for a period longer than 500 ms, the event is regarded as the occurrence of an illegal intrusion, while if the duration is not longer than 500 ms, the event is not regarded as the occurrence of an illegal intrusion, and the alarm is not output. This serves to prevent an instantaneous impact applied to the vehicle body from being erroneously recognized by the vehicle-mounted intrusion detection apparatus as being the occurrence of an illegal intrusion.

The present embodiment is suitable for the prevention of erroneous detection when the duration of an alarm condition is shorter than in the case of a human intrusion and when the signal intensity is not very large, such as when the alarm condition detecting signal is generated due to the shaking of the vehicle body by a sudden gust of wind or due to the deformation of the vehicle hood by a human during car washing.

Figure 7:
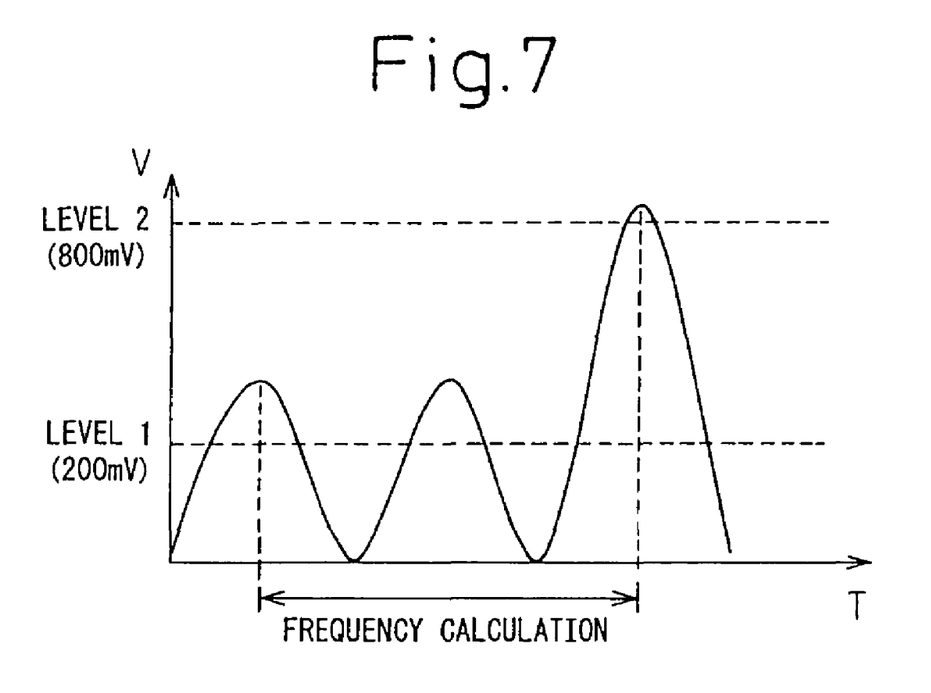
FIG. 7 is a waveform diagram illustrating the operating principle of a vehicle-mounted intrusion detection apparatus according to a third embodiment of the present invention.

FIG. 7 is an input signal waveform diagram for explaining the operating principle of a third embodiment according to the present invention. In this embodiment, erroneous detection is prevented by identifying the frequency range of the signal that would be generated by an illegal human intrusion; that is, when the generated signal is outside the identified frequency range, the signal is not determined as being one indicating an intrusion, even if the intensity level of the signal exceeds the threshold level, i.e., the minimum level that can be determined as indicating the occurrence of an intrusion.

To achieve this, the frequency of the input signal is calculated during the period from the time the signal exceeds the threshold level 1 (for example, 200 mV) to the time the signal reaches the level 2 which is set to a value exhibiting a sufficient intensity, and if the value of the frequency is not larger than the lower limit value (for example, 3 Hz) above which the signal can be determined as being generated by the movement of a human, then it is determined that the signal is not one generated due to an intrusion. Erroneous detection is thus prevented.

Figure 8:
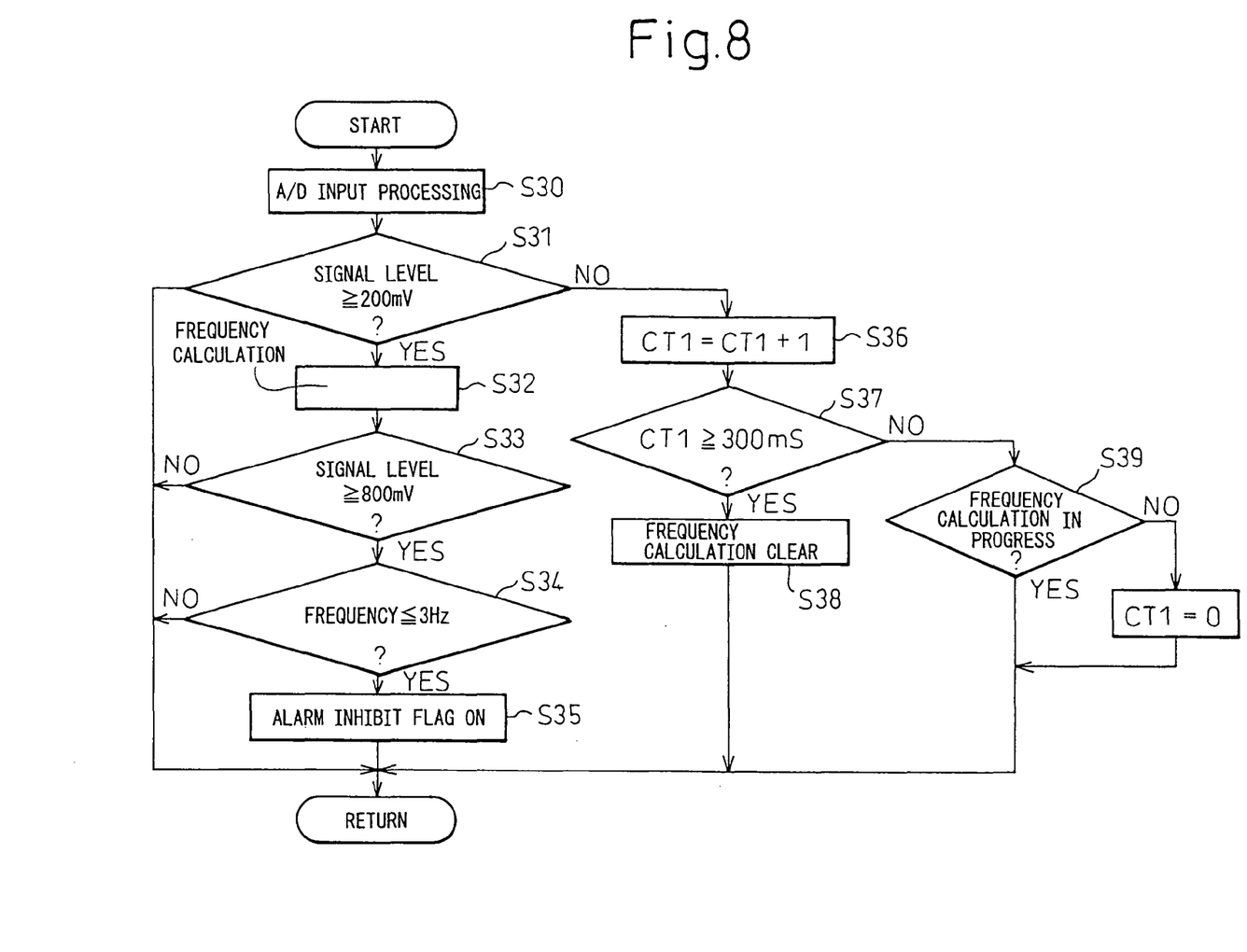
FIG. 8 is a flowchart for explaining the operation of the vehicle-mounted intrusion detection apparatus according to the third embodiment of the present invention.

The processing flow of the microcomputer 40 according to the third embodiment will be described below with reference to the flowchart of FIG. 8. First, in step S30, A/D conversion processing is applied to the input signal. Next, in step S31, it is determined whether the input signal level exceeds the threshold value (level 1) of 200 mV.

If the answer in step S31 is YES, the frequency of the input signal is calculated (step S32). Next, in step S33, it is determined whether the input signal level reaches the level 2, that is, 800 mV; if it does (YES in step S33), then in step S34 it is determined whether the signal frequency at that time is either equal to or lower than 3 Hz.

If the answer in step S34 is YES, as the signal cannot be regarded as being generated due to a human intrusion, the alarm inhibit flag is set ON in step S35. On the other hand, if the answer is NO in step S33 or S34, the process is immediately terminated, to prepare for the next cycle of signal sampling.

On the other hand, if the answer in step S31 is NO, the counter CT1 used to detect whether adjacent signals are a continuous series of signals is incremented (step S36). Next, in step S37, it is determined whether the value of the counter CT1 is either equal to or larger than 300 ms. If YES in step S37, the adjacent signals cannot be regarded as a continuous series of signals; therefore, the frequency calculation is cleared in step S38, and the process is terminated, getting ready for the next cycle of signal sampling.

If the answer in step S37 is NO, as the interval between the adjacent signals is not longer than the time exceeding which the signals are not regarded as a continuous series of signals, it is determined in step S39 whether the frequency calculation is in progress or not; if it is in progress (YES in step S39), the process is immediately terminated, to prepare for the next cycle of signal sampling. If NO in step S39, the signal input can be regarded as having been interrupted; therefore, the counter CT is reset to 0, thus preparing the process for the next cycle of signal sampling.

In this way, it can be determined from the frequency of the input signal whether the signal is really one that is generated due to an illegal human intrusion or one that is generated due to some kind of movement of the vehicle unrelated to a theft. This serves to prevent false alarms, improving the reliability of the alarm. The present embodiment is suitable when discriminating a signal generated due to a human intrusion from a signal generated due to a slow movement of the vehicle, such as when the vehicle body is shaken by wind or when the vehicle body is shaken by the user during car washing.

Each of the embodiments described above can be implemented singly, but it is also possible to construct an apparatus that checks all the conditions prescribed in the respective embodiments, and that does not determine the input signal as being related to an illegal intrusion when any one of the conditions is satisfied.

It is also possible to construct an apparatus that has the function of checking the conditions of both the first and second embodiments, and that does not determine the input signal as being related to an illegal intrusion when both of the conditions are satisfied. In this case, an apparatus can be achieved that does not determine the event as being the occurrence of an intrusion when the limiting condition defined in terms of the rise time of the alarm condition detecting signal and the limiting condition defined in terms of the duration time are both satisfied.

Alternatively, it is possible to construct an apparatus that has the function of checking the conditions of both the second and third embodiments, and that does not determine the input signal as being related to an illegal intrusion when both of the conditions are satisfied. In this case, an apparatus can be achieved that does not determine the input signal as being related to an illegal intrusion when the limiting condition defined in terms of the rise time of the alarm condition detecting signal and the limiting condition defined in terms of the signal frequency are both satisfied.

As described above with reference to the several embodiments, according to the vehicle-mounted intrusion detection apparatus of the present invention, any signal that indicates the occurrence of an intrusion but is generated due to a phenomenon considered unrelated to a theft can be effectively discriminated from a signal that is considered, with high probability, to be one related to a theft. The vehicle-mounted intrusion detection apparatus can thus achieve high reliability in detecting the occurrence of an illegal intrusion.

What is claimed is:

1. A vehicle-mounted intrusion detection apparatus for detecting an intrusion into a vehicle on the basis of a signal produced by a wave transmitted inside the vehicle and a reflected wave thereof, wherein
the vehicle-mounted intrusion detection apparatus is set so as not to recognize the signal as indicating an intrusion if a strength level of the signal reaches a second level higher than a first level within a predetermined time after reaching the first level, said first level being set to be at or higher than a threshold value based on which the presence of an intrusion can be recognized.

2. A vehicle-mounted intrusion detection apparatus for detecting an intrusion into a vehicle on the basis of a signal produced by a wave transmitted inside the vehicle and a reflected wave thereof, wherein
the vehicle-mounted intrusion detection apparatus is set so as not to recognize the signal as indicating an intrusion if a strength level of the signal that is higher than a predetermined level, which predetermined level is set to be at or higher than a threshold value based on which the presence of an intrusion can be recognized, has not lasted continuously for a predetermined length of time.

3. A vehicle-mounted intrusion detection apparatus for detecting an intrusion into a vehicle on the basis of a signal produced by a wave transmitted inside the vehicle and a reflected wave thereof, comprising:
a first detector for detecting that a level of the signal reaches a second level higher than a first level within a predetermined time after reaching the first level;
a second detector for detecting that a maximum level in one cycle of the signal that is higher than a predetermined level has not lasted continuously for a predetermined length of time; and
a third detector for detecting that the frequency of the signal is outside a predetermined frequency range, wherein
the vehicle-mounted intrusion detection apparatus is set so as not to recognize the signal as indicating an intrusion when any one of the first, second, and third detectors has detected the signal.

4. A vehicle-mounted intrusion detection apparatus for detecting an intrusion into a vehicle on the basis of a signal produced by a wave transmitted inside the vehicle and a reflected wave thereof, comprising:
a first detector for detecting that a level of the signal reaches a second level higher than a first level within a predetermined time after reaching the first level; and
a second detector for detecting that a maximum level in one cycle of the signal that is higher than a predetermined level has not lasted continuously for a predetermined length of time, wherein
the vehicle-mounted intrusion detection apparatus is set so as not to recognize the signal as indicating an intrusion when both of the first and second detectors have detected the signal.

5. A vehicle-mounted intrusion detection apparatus for detecting an intrusion into a vehicle on the basis of a signal produced by a wave transmitted inside the vehicle and a reflected wave thereof, comprising:
a first detector for detecting that a maximum level in one cycle of the signal that is higher than a predetermined level, which predetermined level is set to be at or higher than a threshold value based on which the presence of an intrusion can be recognized, has not lasted continuously for a predetermined length of time; and
a second detector for detecting that the frequency of the signal is outside a predetermined frequency range, wherein
the vehicle-mounted intrusion detection apparatus is set so as not to recognize the signal as indicating an intrusion when both of the first and second detectors have detected the signal.

6. A vehicle equipped with a vehicle-mounted intrusion detection apparatus for detecting an intrusion into a vehicle on the basis of a signal produced by a wave transmitted inside the vehicle and a reflected wave thereof, wherein
the vehicle-mounted intrusion detection apparatus is set so as not to recognize the signal as indicating an intrusion if a strength level of the signal reaches a second level higher than the first level within a predetermined time after reaching the first level, said first level being set to be at or higher than a threshold value based on which the presence of an intrusion can be recognized.

7. A vehicle equipped with a vehicle-mounted intrusion detection apparatus for detecting an intrusion into the vehicle on the basis of a signal produced by a wave transmitted inside the vehicle and a reflected wave thereof, wherein
the vehiclemounted intrusion detection apparatus is set so as not to recognize the signal as indicating an intrusion if a strength level of the signal that is higher than a predetermined level, which level is set to be at or higher than a threshold value based on which predetermined the presence of an intrusion can be recognized, has not lasted continuously for a predetermined length of time.

8. A vehicle-mounted intrusion detection apparatus for detecting an intrusion into a vehicle, comprising:
a transmitter for transmitting a wave inside a vehicle;
a receiver for receiving a reflected wave thereof;
a mixer for producing a signal from the transmitted wave and the received wave; and
a computer for detecting an intrusion into a vehicle on the basis of the signal, wherein
the detection of the intrusion is ignored if a strength level of the signal reaches a second level higher than the first level within a predetermined time after reaching the first level, said first level being set to be at or higher than a threshold value based on which the presence of an intrusion can be recognized.

9. A vehicle-mounted intrusion detection apparatus for detecting an intrusion into a vehicle, comprising:
a transmitter for transmitting a wave inside a vehicle;
a receiver for receiving a reflected wave thereof;
a mixer for producing a signal from the transmitted wave and the received wave; and
a computer for detecting an intrusion into a vehicle on the basis of the signal, wherein
the detection of the intrusion is ignored if a strength level of the signal that is higher than a predetermined level, which predetermined level is set to be at or higher than a threshold value based on which the presence of an intrusion can be recognized, has not lasted continuously for a predetermined length of time.

10. A method of detecting an intrusion into a vehicle, comprising the steps of:

transmitting a wave inside the vehicle;

receiving a reflected wave thereof;

producing a signal from the transmitted wave and the received wave;

detecting an intrusion into the vehicle on the basis of the signal, wherein the detection of the intrusion is ignored if a strength level of the signal reaches a second level higher than the first level within a predetermined time after reaching the first level, said first level being set to be at or higher than a threshold value based on which the presence of an intrusion can be recognized.

11. A method of detecting an intrusion into a vehicle, comprising the steps of:

transmitting a wave inside the vehicle;

receiving a reflected wave thereof;

producing a signal from the transmitted wave and the received wave;

detecting an intrusion into the vehicle on the basis of the signal, wherein the detection of the intrusion is ignored if a strength level of the signal that is higher than a predetermined level, which predetermined level is set to be at or higher than a threshold value based on which the presence of an intrusion can be recognized, has not lasted continuously for a predetermined length of time.

* * * * *

UNITED STATES PATENT AND TRADEMARK OFFICE
CERTIFICATE OF CORRECTION

PATENT NO. : 7,030,741 B2  
APPLICATION NO. : 10/626240  
DATED : April 18, 2006  
INVENTOR(S) : Sasaki Page 1 of 1

It is certified that error appears in the above-identified patent and that said Letters Patent is hereby corrected as shown below:

In the Claims

Column 10, line 31, Claim 7    Delete "vehiclemounted"  
Insert --vehicle-mounted--

Column 10, line 34, Claim 7    After "which",  
Insert --predetermined--

Column 10, line 35, Claim 7    Delete "on which predetermined",  
Insert --on which--

Signed and Sealed this

Thirteenth Day of February, 2007

JON W. DUDAS  
*Director of the United States Patent and Trademark Office*